United States Patent
Kayano

(10) Patent No.: US 10,281,806 B2
(45) Date of Patent: May 7, 2019

(54) PROJECTION LENS, PROJECTOR, AND METHOD OF PREVENTING IMAGE DETERIORATION THEREOF

(71) Applicant: FUJIFILM Corporation, Tokyo (JP)

(72) Inventor: Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/696,686

(22) Filed: Sep. 6, 2017

(65) Prior Publication Data

US 2017/0363940 A1   Dec. 21, 2017

Related U.S. Application Data

(63) Continuation of application No. PCT/JP2016/058098, filed on Mar. 15, 2016.

(30) Foreign Application Priority Data

Mar. 31, 2015   (JP) ................................. 2015-070816

(51) Int. Cl.
G02B 7/02 (2006.01)
G03B 21/16 (2006.01)
(Continued)

(52) U.S. Cl.
CPC .............. G03B 21/16 (2013.01); G02B 7/02 (2013.01); G02B 13/16 (2013.01);
(Continued)

(58) Field of Classification Search
USPC ....................................................... 359/820
See application file for complete search history.

(56) References Cited

U.S. PATENT DOCUMENTS 5,426,474 A * 6/1995 Rubtsov ................... G02B 6/04
                                                          353/1
5,717,529 A   2/1998 Scharf
(Continued)

FOREIGN PATENT DOCUMENTS

JP          8-272291 A    10/1996
JP      2005-128217 A     5/2005
(Continued)

OTHER PUBLICATIONS

International Search Report (PCT/ISA/210) issued in PCT/JP2016/058098, dated May 31, 2016.
(Continued)

Primary Examiner — Robert E. Tallman
Assistant Examiner — Gary W O'Neill
(74) Attorney, Agent, or Firm — Birch, Stewart, Kolasch & Birch, LLP

(57) ABSTRACT

A projection lens includes: first to fifth lenses; a light shielding ring; an aperture stop; and a lens barrel. The light shielding ring is rotated in a circumferential direction of the lens barrel by a rotation mechanism. In a case where an image forming panel is shifted with respect to an optical axis of the projection lens, a part, through which the light passes, is biased in the projection lens, whereby temperature distribution occurs in the lens barrel in the direction perpendicular to the optical axis. The thermal deformation of the high temperature side of the lens barrel due to the temperature distribution is greater than that on the low temperature side. The respective lenses may be tilted due to thermal deformation. By rotating the light shielding ring through the rotation mechanism, the temperature increases uniformly in the circumferential direction of the light shielding ring.

15 Claims, 8 Drawing Sheets

(51) Int. Cl.
| | |
|---|---|
| *H04N 5/74* | (2006.01) |
| *G02B 13/16* | (2006.01) |
| *G02B 27/00* | (2006.01) |
| *H04N 9/31* | (2006.01) |
| *G03B 21/14* | (2006.01) |
| *G03B 21/20* | (2006.01) |
| *G03B 21/00* | (2006.01) |

(52) U.S. Cl.
CPC ....... *G02B 27/0068* (2013.01); *G03B 21/005* (2013.01); *G03B 21/142* (2013.01); *G03B 21/2033* (2013.01); *H04N 5/74* (2013.01); *H04N 9/3141* (2013.01); *H04N 9/3144* (2013.01); *G02B 7/028* (2013.01)

(56) References Cited

U.S. PATENT DOCUMENTS

| | | | | |
|---|---|---|---|---|
| 6,710,931 | B1* | 3/2004 | Misaka | G02B 15/177 |
| | | | | 359/676 |
| 2001/0050758 | A1* | 12/2001 | Suzuki | G02B 5/09 |
| | | | | 353/69 |
| 2007/0097337 | A1 | 5/2007 | Morikuni et al. | |
| 2007/0279602 | A1 | 12/2007 | Sato | |
| 2008/0055562 | A1* | 3/2008 | Zhang | G03B 21/16 |
| | | | | 353/61 |
| 2008/0231813 | A1 | 9/2008 | Kawakami | |
| 2010/0171937 | A1 | 7/2010 | Hirata et al. | |
| 2011/0235001 | A1 | 9/2011 | Matsumoto | |
| 2012/0287516 | A1* | 11/2012 | Nakajima | G03B 9/06 |
| | | | | 359/738 |
| 2014/0268073 | A1* | 9/2014 | Takano | G02B 13/0065 |
| | | | | 353/99 |

FOREIGN PATENT DOCUMENTS

| | | |
|---|---|---|
| JP | 2006-184844 A | 7/2006 |
| JP | 2009-086233 A | 7/2006 |
| JP | 2007-212731 A | 8/2007 |
| JP | 2007-322960 A | 12/2007 |
| JP | 2008-233641 A | 10/2008 |
| JP | 2010-15180 A | 1/2010 |
| JP | 2010-160296 A | 7/2010 |
| JP | 2010-243542 A | 10/2010 |
| JP | 2011-227472 A | 11/2011 |

OTHER PUBLICATIONS

Written Opinion (PCT/ISA/237) issued in PCT/JP2016/058098, dated May 31, 2016.
Japanese Office Action, dated Aug. 29, 2018, for corresponding Japanese Application No. 2017-509520, with an English machine translation.

* cited by examiner

PROJECTION LENS, PROJECTOR, AND METHOD OF PREVENTING IMAGE DETERIORATION THEREOF

CROSS-REFERENCE TO RELATED APPLICATIONS

This application is a Continuation of PCT International Application No. PCT/JP2016/058098 filed on Mar. 15, 2016, which claims priority under 35 U.S.C. § 119(a) to Japanese Patent Application No. 2015-070816 filed on Mar. 31, 2015. Each of the above application(s) is hereby expressly incorporated by reference, in its entirety, into the present application.

BACKGROUND OF THE INVENTION

1. Field of the Invention

The present invention relates to a projection lens, a projector, and a method of preventing image deterioration thereof. In particular, a projection lens in which the image forming panel is fixed in a state where the image forming panel is shifted, a projector, and a method of preventing image deterioration of the projector.

2. Description of the Related Art

Projectors give an image based on image information to light, which is emitted from a light source, through an image forming panel (light modulation panel), and project the light onto a screen through a projection lens so as to display the image. For example, a liquid crystal display (LCD) or a digital micromirror device (DMD) is used as the image forming panel. Further, in the projectors, in order to improve image quality of the projected image, stops are arranged in the illumination optical system and the projection lens, and rays not contributing to image formation are removed.

In recent projectors, due to improvement of various image forming panels and light sources such as LCDs and DMDs, an illuminance of an image, which is projected, has been increased as compared with the related art. Therefore, in a case where a stop is disposed in the vicinity of a light source, a temperature of the stop remarkably increases. As a result, the temperature of the lens barrel holding the stop becomes higher than that in the related art. For this reason, an increase in temperature caused by emission of rays to the stop is suppressed by forming a reflective area in the stop or by placing a metal plate as a heat shielding member (for example, refer to JP2005-128217A). Furthermore, air is sent by fins provided on the lens holding frame to an aberration correction lens of the projection lens so as to cool the aberration correction lens (for example, refer to JP2010-243542A).

SUMMARY OF THE INVENTION

In a case where the optical axis of the projection lens is perpendicular to a screen, an image, which is displayed on the image forming device, is directly projected onto the screen in an enlarged manner. However, in most cases, the screen is disposed above the projector. Therefore, the image forming panel is disposed in a direction opposite to the direction in which the screen is shifted with respect to the optical axis of the projection lens.

In a case where the image forming panel is shifted in a certain direction and projection onto the screen is performed, rays, which are deviated in the direction in which the image forming panel is shifted from the center of the optical axis of the projection lens, pass through the lens. Therefore, it can be seen that the temperature increases at the position, at which the light passes, in the projection lens. Accordingly, in the lens barrel of the projection lens, in a case where the image forming panel is shifted in the direction perpendicular to the optical axis, temperature distribution occurs on the shift side and the opposite side thereto. Due to the uneven temperature distribution of the lens barrel in the circumferential direction thereof, the lens barrel or a member holding the lens is deformed, and a plurality of lenses constituting the projection lens or a part of the lenses thereof is tilted or displaced. In a case where the lenses are tilted, the optical performance of the projection lens changes from the design value. Thus, this change may deteriorate the quality of the image projected onto the screen.

In JP2005-128217A, a reflecting member or a heat shielding member is provided in the stop, and an increase in temperature of the stop caused by rays unnecessary for image formation is suppressed. Further, in JP2010-243542A, air is sent by the lens holding frame and the fin to the aberration correction lens of the projection lens so as to cool the aberration correction lens. As a result, an increase in temperature of the lens barrel is suppressed. However, in a case of merely suppressing the increase in temperature as in JP2005-128217A and JP2010-243542A, there is no study about a temperature difference in the direction perpendicular to the optical axis of the projection lens. Thus, the tilt and the displacement of the lens are not suppressed, and the quality of the image projected onto the screen still deteriorates. Accordingly, new measures therefor have been desired.

The present invention has been made in consideration of such a situation, and its object is to provide a projection lens, a projector, and a method of preventing image deterioration of the projector capable of suppressing deterioration in quality of an image to be projected by eliminating uneven temperature distribution in a circumferential direction of a lens barrel as a direction perpendicular to an optical axis of a projection lens.

In order to achieve the object, a projection lens of the present invention comprises: a lens; a lens barrel that holds the lens; a light shielding member that has an annular shape; and a rotation mechanism. The light shielding member is formed in an annular shape having an opening through which the optical axis passes, and is mounted on the lens barrel rotatably about the optical axis of the lens. The rotation mechanism rotates the light shielding member about the optical axis.

A projector of the present invention comprises: the projection lens; an image forming panel; and a light source. The image forming panel is disposed such that a center thereof is shifted with respect to an optical axis of the projection lens, and forms an image. The light source emits light onto the image forming panel and the image is projected onto a projection surface through the projection lens.

In a method of preventing image deterioration of a projector of the present invention, a center of an image forming panel is shifted with respect to an optical axis of a projection lens and an image of the image forming panel is projected onto a projection surface through the projection lens by emitting light from a light source onto the image forming panel. The method of preventing image deterioration of the projector comprises: mounting a light shielding member that has an annular shape having an opening, through which the optical axis passes, on a lens barrel such that the light shielding member is rotatable about the optical axis; and rotating the light shielding member.

It is preferable that the rotation mechanism performs first rotation, which is for rotating at a first rotation speed, and second rotation which is for rotating at a second rotation speed lower than the first rotation speed after a certain period of time. Further, it is preferable that the rotation mechanism performs intermittent rotation to repeat rotation and stop, and performs first rotation, which is based on first intermittent rotation, and second rotation which is based on second intermittent rotation through which a period of time of the stop is longer than that of the first intermittent rotation after a certain period of time. It is preferable that the rotation mechanism has a control section having a sensor which detects a temperature of the lens barrel, and the control section performs switching from the first rotation to the second rotation on the basis of change in temperature of the lens barrel.

It is preferable that the light shielding member is a light shielding ring which is provided to be closer to the light source than an aperture stop determining an F number of the projection lens. It is preferable that the rotation mechanism has a light shielding member side gear which is formed circumferentially on an outer peripheral portion of the light shielding member, a driving gear which engages with the light shielding member side gear, and a motor which rotates the driving gear. It is preferable that the lens barrel is made of synthetic resin. Further, it is preferable that the light shielding member is made of metal.

It is preferable that in a case where a distance from the optical axis of the projection lens to the center of the image forming panel is Y, a length of the image forming panel in a direction of shift is H, and an amount of shift of the image forming panel, which is obtained by dividing the distance Y by the length H, is set as S=Y/H, the amount of shift S is in a range of 0.4<S<0.7.

According to the present invention, by rotating the annular light shielding member mounted on the lens barrel about the optical axis of the projection lens, even in a case where the light shielding member is partially heated by the light passing through the projection lens, temperature distribution thereof is uniformized in the circumferential direction through the rotation. In a state where the light shielding member is fixed, temperature distribution is generated in the circumferential direction of the lens barrel and the highly heated side expands due to this temperature distribution, by heating a part of the light shielding member, so that the lens barrel is distorted, and the position and the angle of the lens deviate from designed values thereof. As a result, the projected image may deteriorate. However the deterioration can be suppressed with the present invention. In addition, the entire light shielding member is gradually heated through the rotation of the light shielding member, and thus the projected image does not rapidly deteriorate.

DESCRIPTION OF THE PREFERRED EMBODIMENTS

First Embodiment

Figure 1:
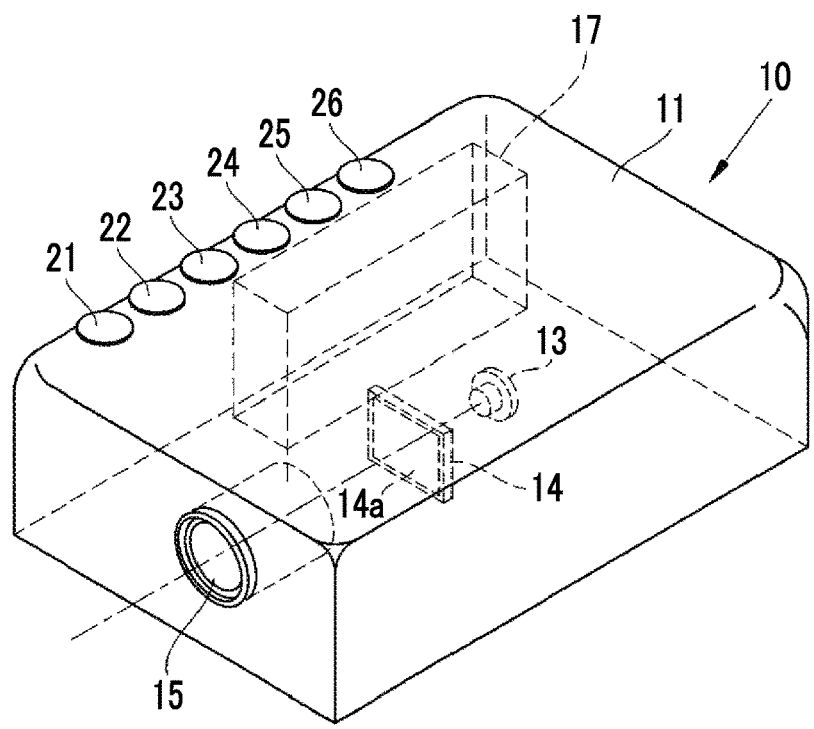
FIG. 1 is a perspective view illustrating a schematic configuration of a projector of the present invention.

As shown in FIG. 1, in a projector 10 of the present embodiment, a casing 11, which has a substantially rectangular parallelepiped shape, houses a light source 13, an image forming panel 14, a projection lens 15, and a control section 17. A zoom dial 21, a light amount adjustment dial 22, a focus dial 23, a vertical keystone adjustment dial 24, a horizontal keystone adjustment dial 25, and a screen adjustment dial 26 are provided on the upper surface of the casing 11. The light, which is emitted from the light source 13, carries an image through an image forming surface 14a, is emitted through the projection lens 15, and is projected onto a screen (not shown in FIG. 1, and indicated by a reference numeral of 20 in FIG. 3).

Figure 2:
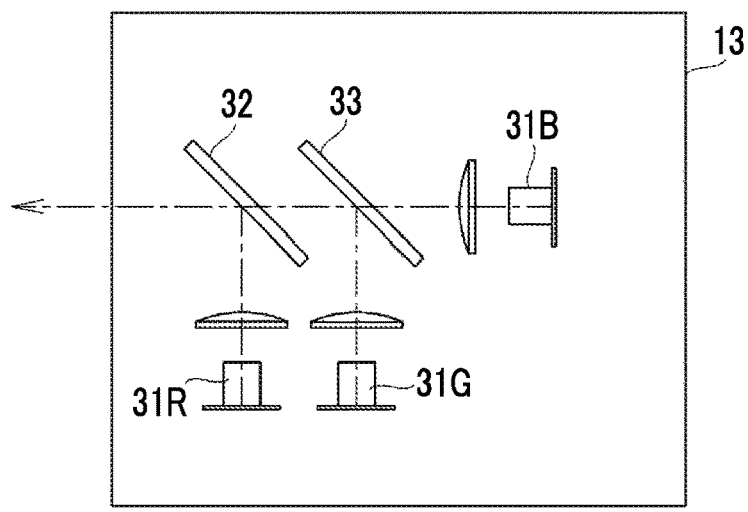
FIG. 2 is a schematic diagram of a light source.

As shown in FIG. 2, the light source 13 has light emitting diodes (LEDs) 31R, 31G and 31B which respectively emit light beams with three colors such as RGB. The light, which is emitted from the R (red) LED 31R, is reflected by the dichroic mirror 32, and the light, which is emitted from the G (green) LED 31G is reflected by the dichroic mirror 33, and is transmitted through the dichroic mirror 32. The light, which is emitted from the B (blue) LED 31B, is transmitted through the dichroic mirrors 32 and 33, and the light beams with three colors such as RGB are emitted onto the optical axis.

The control section 17 sequentially displays images with three colors such as RGB on the image forming surface 14a with the light of the light source 13, and emits respective light beams from the LEDs 31R, 31G and 31B of the light source 13 in synchronization with the three-color images. Further, the control section 17 also performs the following processing. For example, in a case of receiving an operation signal of the zoom dial 21, a size of the image projected onto the screen 20 is adjusted. In a case of receiving an operation signal of the light amount adjustment dial 22, a brightness of the image projected onto the screen 20 is adjusted. In a case of receiving an operation signal of the focus dial 23, a focus adjustment mechanism (not shown) of the projection lens 15 is operated to adjust the focus of the central portion of the image projected onto the screen 20. In a case of receiving an operation signal of the vertical keystone adjustment dial 24, a first motor of an attitude adjustment device (not shown) is rotated. Thereby, the projection lens 15 is rotated about a horizontal axis perpendicular to the optical axis L, and the tilt of the projection lens 15 in the vertical direction is adjusted. In a case of receiving an operation signal of the horizontal keystone adjustment dial 25, the second motor of the posture adjustment device is rotated. Thereby, the projection lens 15 is rotated about the vertical axis orthogonal to the optical axis L, and the tilt of the projection lens 15 in the horizontal direction is adjusted. In a case of receiving an operation signal of the screen adjustment dial 26, a display size and a shape of the image formed on the image forming surface 14a of the image forming panel 14 are changed. For example, the display size and shape are changed such that the rectangular image is not displayed as a trapezoidal image in accordance with the tilt angle of the projection lens 15. Further, the control section 17 also controls a rotation mechanism 40 to be described later.

As the image forming panel 14, a transmissive liquid crystal panel, or a digital micro mirror device is used. Further, the light source 13 may be a xenon lamp, a halogen lamp, or an extra high pressure mercury lamp which emits white light instead of an LED which sequentially emits light with three colors such as RGB. In this case, a transmissive color liquid crystal panel is used as the image forming panel 14.

Figure 3:
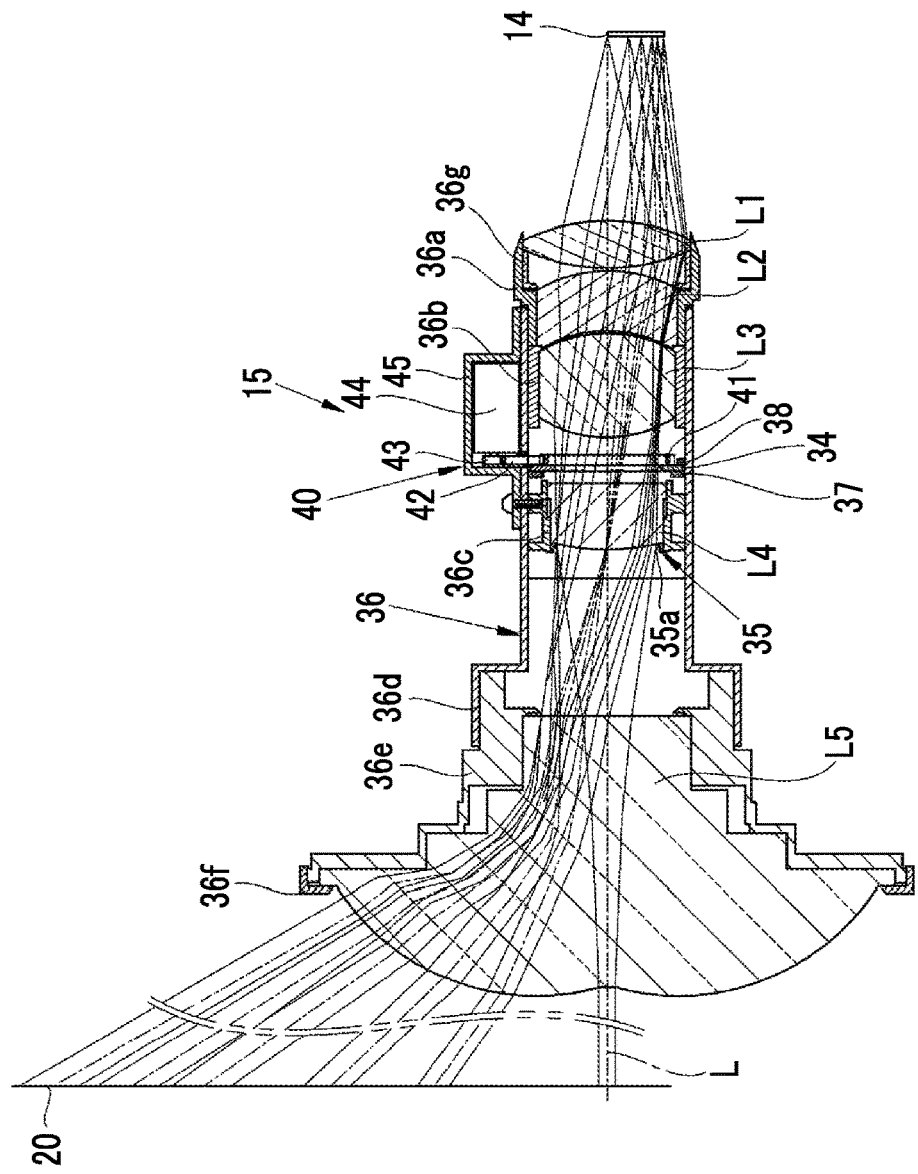
FIG. 3 is a vertical cross-sectional view illustrating a projection lens.

As shown in FIG. 3, the images are projected upward onto the screen 20 with respect to an optical axis L of the projection lens 15. The center of the image forming panel 14 is fixed in a state where the center is shifted downward in a direction perpendicular to the optical axis L, with respect to the optical axis L of the projection lens 15, that is, in a direction opposite to the direction in which the central position of the projected image (projection surface of the screen 20) is deviated with respect to the optical axis L of the projection lens 15.

Figure 4:
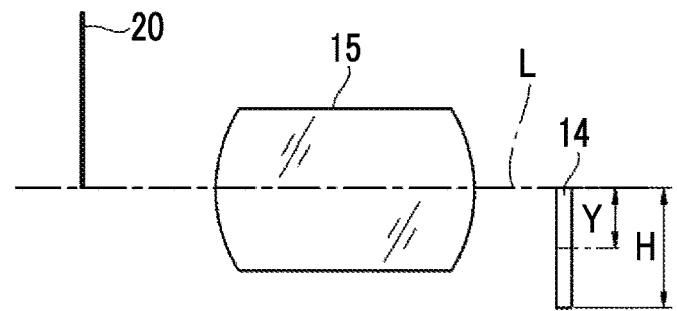
FIG. 4 is a schematic diagram illustrating an amount of shift of an image forming panel.

An amount of shift of the image forming panel 14 will be described with respect to FIG. 4. Assuming that an amount of shift (distance) from the optical axis L of the projection lens 15 to the center of the image forming panel 14 is Y and a length of the image forming panel 14 in the direction of shift is H, an amount of shift S (shift rate) of the image forming panel 14 is defined by the following expression: S=Y/H. That is, in a case where S=0.5, as shown in FIG. 4, the end face of the image forming panel 14 coincides with the optical axis L of the projection lens 15. Further, in a case where S>0.5 (S is larger than 0.5), the end portion of the image forming panel 14 is shifted in a direction of separation from the optical axis L of the projection lens 15. In a case where S=0, the center of the image forming panel 14 coincides with the optical axis L of the projection lens 15, and thus the arrangement is similar to that of the conventional long distance projection type.

It is preferable that the amount of shift S of the image forming panel 14 is greater than 0.4 and less than 0.7. In a case where the amount of shift S is greater than 0.4, the effect of the temperature in the vertical direction of the projection lens 15 becomes ignorable as compared with the case where the amount of shift is equal to or less than 0.4. On the other hand, in a case where the amount of shift S is less than 0.7, the amount of shift of the image forming panel 14 does not become extremely larger than that in the case where the amount of shift is equal to or greater than 0.7. Thus, an increase in size of the lens system is suppressed, thereby preventing deterioration of manufacturing suitability. Therefore, by setting the amount of shift S of the image forming panel 14 within the above range, it is possible to provide a product having high performance while reducing the effect of the temperature in the vertical direction of the projection lens 15. It is more preferable that the amount of shift S of the image forming panel 14 is greater than 0.45 and less than 0.6.

As shown in FIG. 3, the projection lens 15 comprises first to fifth lenses L1 to L5, a light shielding ring (light shielding member) 34 as a flare stopper, an aperture stop 35, and a lens barrel 36 which are arranged in order from the image forming panel 14. The first lens L1 has convex surfaces on both sides, and the second lens L2 has a concave surface on a screen 20 side and has a convex surface on a side of the image forming panel 14. The third lens L3 has convex surfaces on both sides, and the fourth lens L4 has a convex surface on the screen 20 side and has a planar surface on the side of the image forming panel 14. The fifth lens L5 has an aspheric surface convex on the screen 20 side and has a planar surface on the side of the image forming panel 14.

The lens barrel 36 is configured such that a plurality of lens holding frames 36a to 36f and spacers 36g are fit therein, and holds the first to fifth lenses L1 to L5, the light shielding ring 34, and the aperture stop 35. The lens holding frames 36a to 36f and the spacers 36g have complicated cross-sectional shapes, and are thus formed of synthetic resin such as polycarbonate. It should be noted that some or all of the lens holding frames 36a to 36f and the spacers 36g may be made of metal.

The aperture stop 35 is disposed on a surface of the fourth lens L4 on the screen 20 side. The aperture stop 35 is made of aluminum or another metal, and is formed in an annular shape having a circular opening 35a which determines the F number. A black layer is formed on the surface of the aperture stop 35 through coating or plating. A position of the aperture stop 35 is set as the position of the stop.

The light shielding ring 34 for shielding undesired light is disposed between the third lens L3 and the second lens L2. The light shielding ring 34 is formed in an annular shape having a circular opening 34a, and a black layer is formed on the surface thereof through coating or plating. The light shielding ring 34 is mounted rotatably in the circumferential direction of the lens barrel 36 such that the first guide ring 37 and the second guide ring 38 hold the outer peripheral portion thereof. The first guide ring 37 is fixed onto the inner peripheral surface of the lens barrel 36 on the screen 20 side with respect to the light shielding ring 34, and the second guide ring 38 is fixed onto the inner peripheral surface of the lens barrel 36 on the image forming panel 14 side with respect to the light shielding ring 34.

The light, which is incident into the projection lens 15, passes mostly through the lower side of the optical axis L of the projection lens 15. Then, the passage path of the light is reversed at the position of the stop, and the light passes mostly through the upper side of the projection lens 15, and is projected onto the screen 20. The passage path of the light, which passes through the respective positions of the image forming panel 14, in the projection lens 15 is schematically indicated by a solid line, and the center of the light is indicated by the chain line.

Since the image forming panel 14 is disposed to be shifted downward with respect to the optical axis L, the light passes mostly through the lower side with respect to the optical axis L of the projection lens 15, that is, in a direction in which the image forming panel 14 within the projection lens 15 is shifted, to the position of the stop within the projection lens 15. Accordingly, the lower side part of the projection lens 15 on the side, to which the image forming panel 14 is shifted, is heated by passage of light, and temperature distribution occurs in the projection lens 15 in a direction perpendicular to the direction of passage of light. Regarding the temperature distribution, for example, it is preferable to make the temperature distribution uniform by performing a cooling operation using blowing or another cooling operation on a high temperature part thereof. Instead of or in addition to the cooling operation, it is preferable to make the temperature distribution uniform by heating the other low temperature part.

A similar phenomenon occurs also in the light shielding ring 34, and the temperature distribution occurs in the direction perpendicular to the direction through which the light passes. As the temperature difference increases, not only the light shielding ring 34 but also the lens barrel 36, which holds the light shielding ring 34, is deformed by heating only one side. Due to the deformation, the lenses L1 to L5 are tilted, and the quality of the formed image deteriorates. Furthermore, the rotational symmetry of the first to fifth lenses L1 to L5 is destroyed by the tilt of the first to fifth lenses L1 to L5. Therefore, not only deterioration in resolving power of the entire formed image but also deviation in focus position in the diagonal direction due to occurrence of the field curvature and the like occur. This leads to deterioration in performance of the entire projected image.

Figure 5:
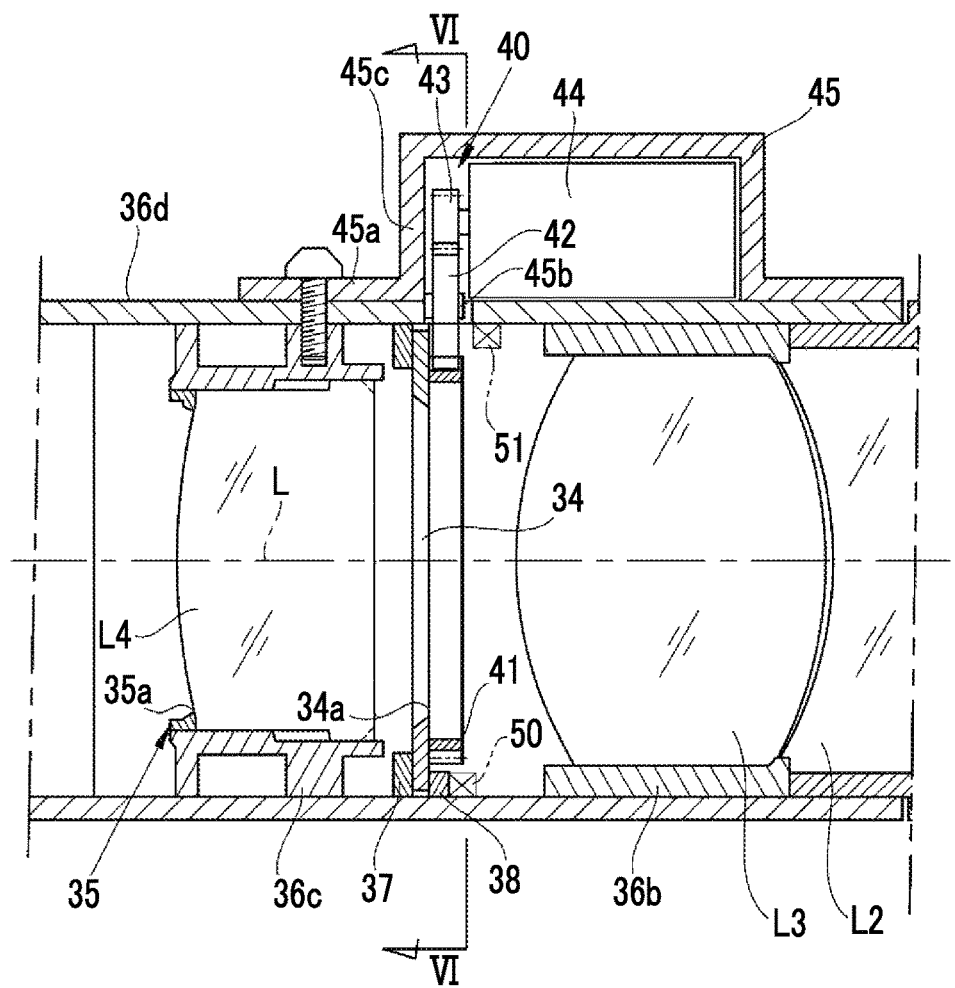
FIG. 5 is a vertical cross-sectional view illustrating a rotation mechanism of a light shielding ring.

As shown in FIG. 3, the light shielding ring 34 is rotated in the circumferential direction by the rotation mechanism 40 in order to suppress the thermal deformation caused by setting of the shift of the image forming panel 14 with respect to the optical axis L. As shown in FIG. 5, the rotation mechanism 40 comprises a ring gear (light shielding member side gear) 41, an intermediate gear 42, a driving gear 43, a motor 44, and a motor casing 45. The ring gear 41 is formed in a ring shape, and is integrally mounted on, for example, the light source side surface at the outer peripheral portion of the light shielding ring 34. Teeth are formed on the outer peripheral surface of the ring gear 41 along the circumferential direction. The intermediate gear 42 is mounted on the end plate 45c of the motor casing 45 so as to be rotatable through the attachment shaft 45b, and is engaged with the ring gear 41. The driving gear 43 is fixed onto the driving shaft of the motor 44, and is engaged with the intermediate gear 42.

The motor 44 is fixed onto the outer peripheral surface of the lens barrel 36 by the motor casing 45. The motor casing 45 is made of a metal such as aluminum, for example, and is formed in a rectangular box shape. A mounting flange 45a extends on a peripheral edge of a housing opening of the motor casing 45. An intermediate gear 42 is rotatably mounted on the screen side end plate 45c of the motor casing 45. In the second guide ring 38, a notch 38a is formed to correspond to the portion of engagement between the ring gear 41 and the intermediate gear 42.

The motor 44 is controlled by the control section 17 so as to rotate when the light source 13 is turned on. By rotating the light shielding ring 34 in the circumferential direction, for example, it is possible to suppress the increase in temperature on the lower side of the light shielding ring 34 as compared with the upper side, and it is possible to increase the temperature uniformly in the circumferential direction. Thereby, as compared with the case where the light shielding ring 34 is fixed, the temperature distribution in the circumferential direction is made to be uniform, and deformation of a part of the lens barrel 36 caused by uneven temperature distribution is suppressed. In particular, it is possible to reduce the temperature difference between the lower side of the lens barrel 36, of which the temperature is raised through the passage of light, and the upper side as the opposite side. As a result, the first to fifth lenses L1 to L5 within the projection lens 15 are prevented from being tilted. In such a manner, in the present invention, the method of preventing image deterioration is performed. The rotation speed of the light shielding ring 34 is not particularly limited. However, it is preferable that the speed is as low as possible within a range where temperature distribution does not occur such that power consumption is suppressed and the ring does not become a source of vibration.

Second Embodiment

Figure 7:
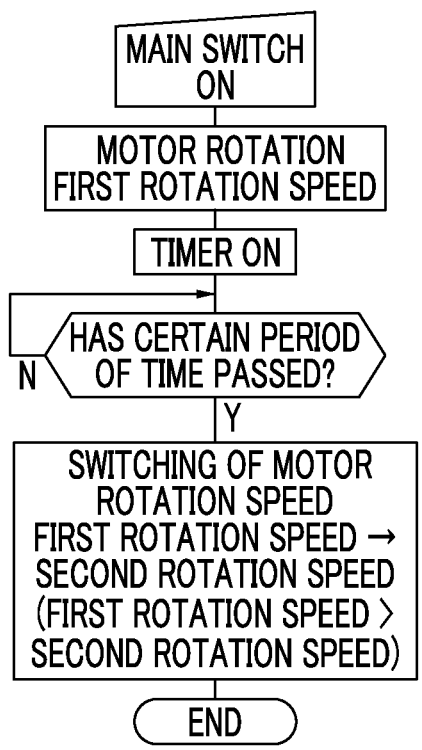
FIG. 7 is a flowchart illustrating a procedure of control performed in a control section of a second embodiment.

In the first embodiment, the light shielding ring 34 is rotated continuously at a constant speed. However, as shown in FIG. 7, in the second embodiment, after a certain period of time, switching from a first rotation speed and a second rotation speed, which is lower than the first rotation speed, is performed. Since the increase in temperature starts from the room temperature at the start of use of the projector, unevenness in temperature distribution caused by the light shielding ring 34 tends to occur. Therefore, in a case where the lenses L1 to L5 within the projection lens 15 are rotated at a rotation speed at which unevenness in temperature distribution is likely to be eliminated and the lenses L1 to L5 within the projection lens 15 reach a thermally saturated state, by performing switching to low speed rotation within a range where unevenness in temperature distribution does not occur, power saving is achieved, and occurrence of vibration is suppressed.

Third Embodiment

Figure 8:
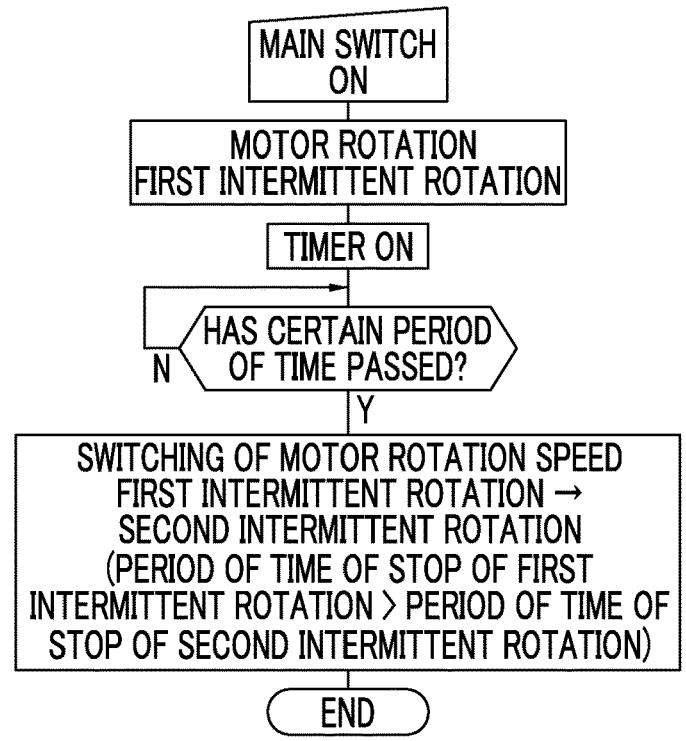
FIG. 8 is a flowchart illustrating a procedure of control performed in a control section of a third embodiment.

As shown in FIG. 8, in the third embodiment, instead of switching the rotation speed in the second embodiment, by performing intermittent rotation for repeating rotation and stop of the light shielding ring 34 and changing the length of the period of time of the stop at that time, switching from first intermittent rotation to second intermittent rotation is performed. The second intermittent rotation is set such that the period of time of the stop is longer than that of the first intermittent rotation. Also in the third embodiment, as in the second embodiment, it is possible to suppress power consumption and vibration. The second embodiment and the third embodiment may be combined as follows. First, the light shielding ring 34 may be rotated at the first rotation speed. Then, the light shielding ring 34 may be rotated at the second rotation speed slower than the first rotation speed, and may be subsequently rotated intermittently at the second rotational speed.

Fourth Embodiment

Figure 6:
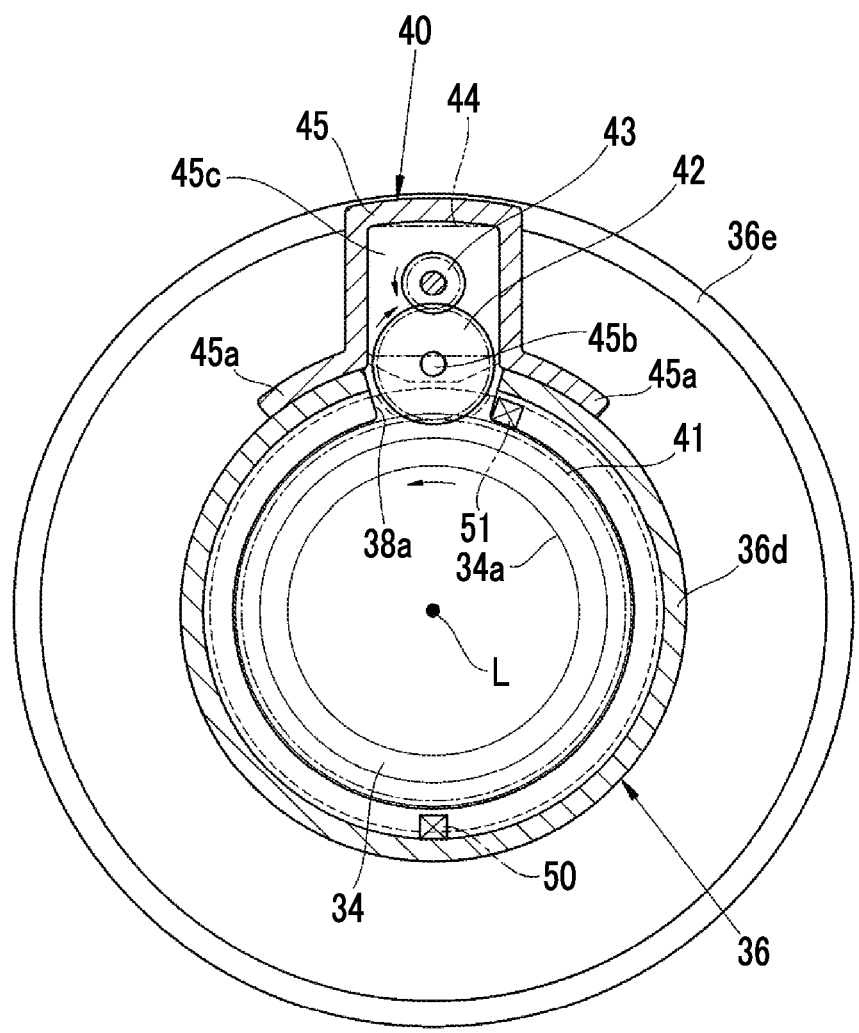
FIG. 6 is a cross-sectional view taken by the line VI-VI in FIG. 5.
Figure 9:
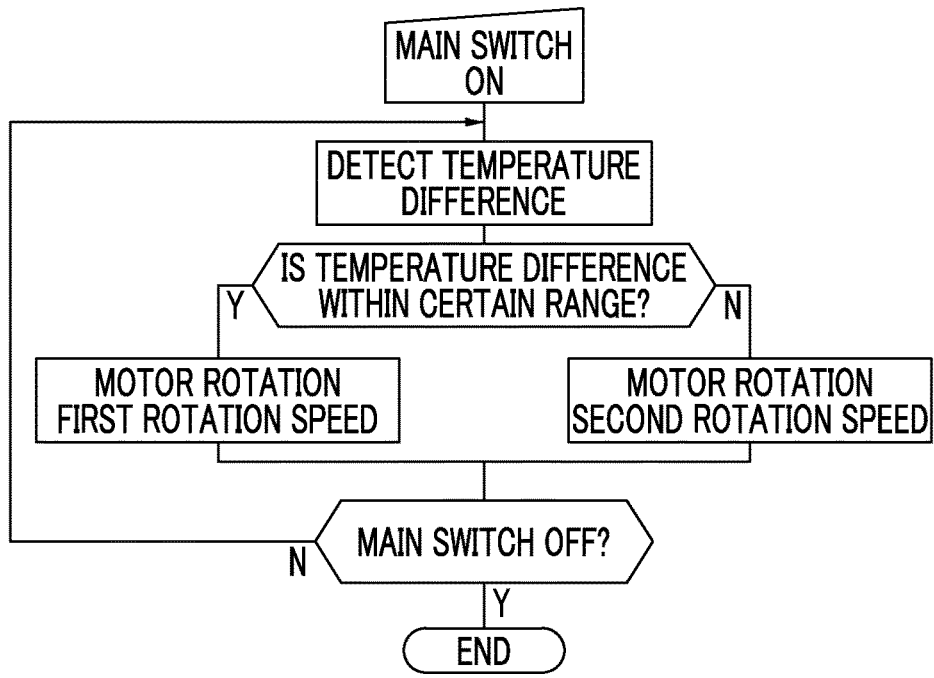
FIG. 9 is a flowchart illustrating a procedure of control performed in a control section of a fourth embodiment.

As shown in FIG. 9, in the fourth embodiment, instead of switching after a certain period of time in the second embodiment, switching is performed on the basis of temperature difference information obtained through temperature detection. In this case, the control section 17 controls the rotation of the motor 44 on the basis of a temperature detection signal sent from the first sensor 50 and the second sensor 51 provided inside the lens barrel 36. Since the device configuration is the same as that of the second embodiment, description thereof will be given with reference to FIGS. 5 and 6.

The second sensor 51 measures the temperature of the lens barrel 36 of the projection lens 15 on the side opposite to the side to which the image forming panel 14 is shifted, and is mounted on the upper inner wall of the lens barrel 36, for example, as shown in FIG. 5. The first sensor 50 measures the temperature of the lens barrel 36 on the side to which the image forming panel 14 is shifted, and is mounted on the lower inner wall of the lens barrel 36, for example, as shown in FIG. 5. The rotational speed of the motor 44 is controlled on the basis of the difference between the temperatures of the lens barrel 36 which are measured by the first sensor 50 and the second sensor 51. The light shielding ring 34 is rotated such that the difference between the measurement result of the temperature of the lens barrel 36 measured by the first sensor 50 and the measurement result of the temperature of the lens barrel 36 measured by the second sensor 51 is equal to or less than a predetermined temperature difference. Here, the "predetermined temperature difference" is a range that exerts the effect of the present invention, and is a temperature difference in the range in which deterioration in quality of the formed image can be suppressed by maintaining the predetermined temperature difference so as to prevent the projection lens 15 from being tilted. The difference of the temperatures of the lens barrel 36 measured by the first sensor 50 and the second sensor 51 is preferably equal to or less than 50 □C, and is more preferably equal to or less than 30 □C. Instead of switching the rotation speed of the light shielding ring 34 on the basis of the temperature difference, the period of time of the stop in the intermittent rotation of the light shielding ring 34 may be switched on the basis of the temperature difference as in the third embodiment.

Fifth Embodiment

Figure 10:
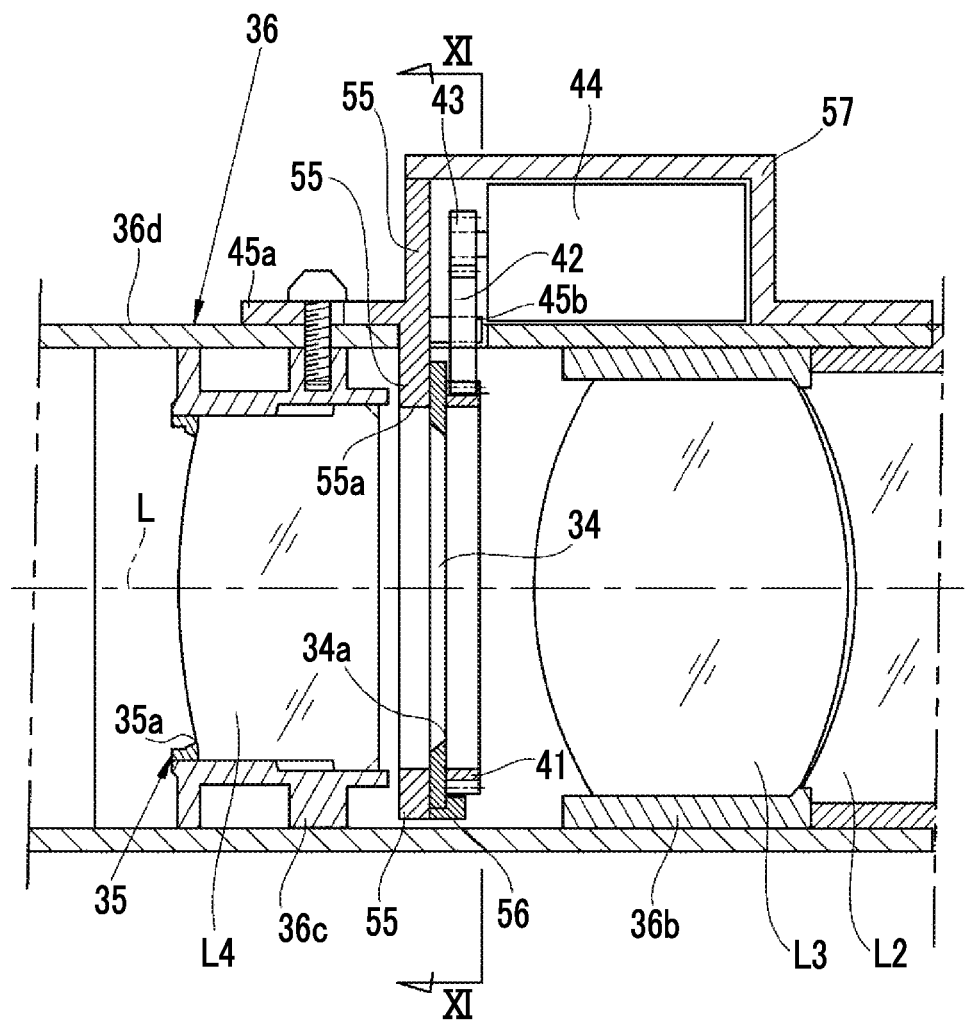
FIG. 10 is a side cross-sectional view illustrating a configuration of a projection lens of a fifth embodiment.
Figure 11:
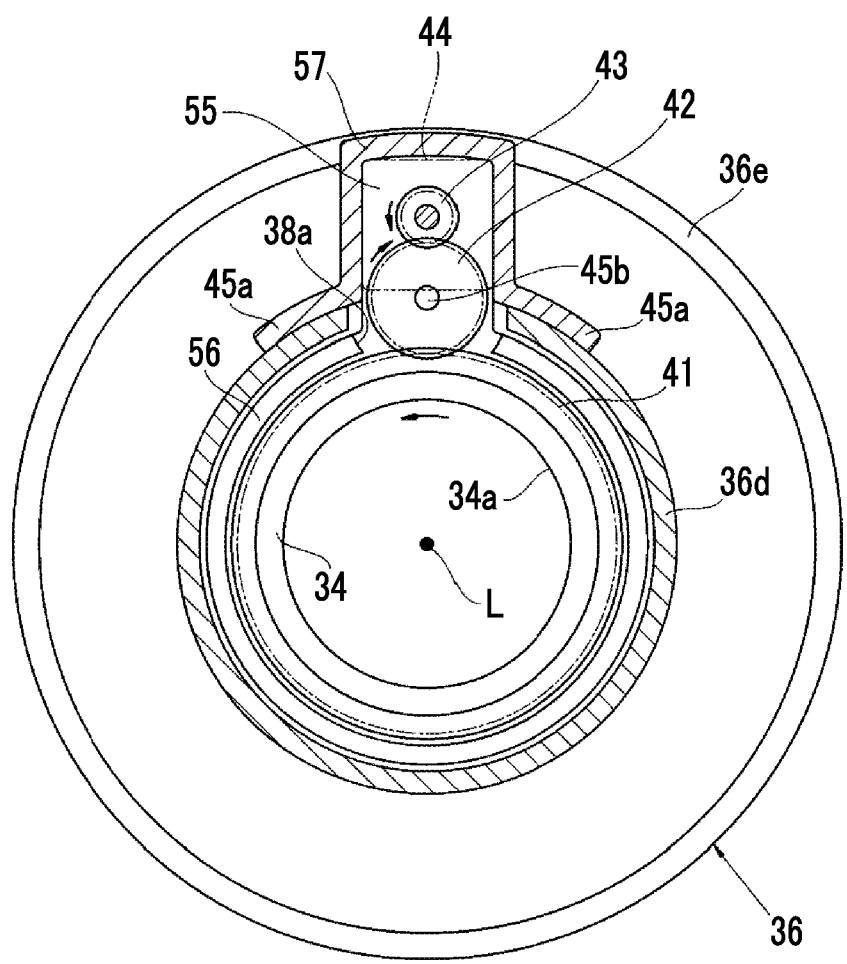
FIG. 11 is a cross-sectional view taken by the line XI-XI in FIG. 10.

As shown in FIGS. 10 and 11, in the fifth embodiment, in order to improve the heat radiation effect of the light shielding ring 34, a gear mounting plate 55 is extended inside the lens barrel 36, and the light shielding ring 34 is mounted thereon. The gear mounting plate 55 is made of a metal such as aluminum, and has an opening 55a at the center. The opening 55a is formed such that a diameter thereof is larger than that of the opening 35a of the light shielding ring 34. Further, the gear mounting plate 55 also serves as the first guide ring 37 of the first embodiment and the screen side end plate 45c (refer to FIG. 5) of the motor casing 45. A second guide ring 56 made of metal is fixed onto the gear mounting plate 55. The gear mounting plate 55 and the second guide ring 56 rotatably hold the light shielding ring 34. Since the gear mounting plate 55 also serves as the screen side end plate of a motor casing 57, the upper portion thereof is exposed to the outside of the lens barrel 36. Thereby, it is possible to further dissipate the heat of the light shielding ring 34 to the outside. Due to this heat dissipation effect, it is possible to suppress the increase in temperature of the lens barrel 36. Thus, deformation of the lens barrel 36 is suppressed to that extent, and deterioration of the projected image is suppressed. It should be noted that the same constituent members as those of the first embodiment are denoted by the same reference numerals and signs, and description of the same constituent members will be omitted.

In the above-mentioned embodiments, the motor 44 for rotating the light shielding ring 34 is provided outside the lens barrel 36. However, in a case where there is a space inside the lens barrel 36, the motor 44 may be provided inside the lens barrel 36. In the above-mentioned embodiments, the intermediate gear 42 is provided between the light shielding ring 34 and the driving gear 43. However, this intermediate gear 42 may be omitted, or the number thereof may be increased as necessary.

In the above-mentioned embodiments, the fixed type light shielding ring 34 is used, but a variable type light shielding ring, of which an aperture diameter is variable and which is not shown, may be used.

In the above-mentioned embodiments, the projector 10 has described in a state where it is placed on a table, but the present invention can be applied even in a case where the projector 10 may be used to be suspended from the ceiling or the like. Although an example in which an image is projected onto the screen 20 has been described, the projection surface is not limited to the screen 20, and a projector, which performs projection onto various projection surfaces, may be used.

EXPLANATION OF REFERENCES

10: projector
13: light source
14: image forming panel
15: projection lens
17: control section
20: screen
34: light shielding ring (light shielding member)
35: aperture stop
36: lens barrel
37, 38: guide ring
40: rotation mechanism
41: ring gear
42: intermediate gear
43: driving gear
44: motor
45, 57: motor casing
50: first sensor
51: second sensor
L: optical axis
L1 to L5: first to fifth lenses

What is claimed is:
1. A projector comprising:
a projection lens that includes a lens, a lens barrel that hold the lens therein, a light shielding ring that is mounted on the lens barrel rotatably in a circumferential direction of the lens barrel about the optical axis of the lens and has an annular shape having an opening through which the optical axis passes, and a rotation mechanism that rotates the light shielding ring about the optical axis;
an image forming panel that forms an image, and that is disposed such that a center thereof is shifted to a first side in a perpendicular direction with respect to an optical axis of the projection lens; and
a light source that emits light onto the image forming panel and the image is projected onto a projection surface through the projection lens,
wherein the light shielding ring is provided to be closer to the light source than an aperture stop determining an F number of the projection lens,
wherein the rotation mechanism has a sensor which detects a temperature of a surface of the lens barrel,
wherein the sensor is on the surface of the lens barrel which is located in the first side with respect to the optical axis,
wherein the rotation mechanism rotates the light shielding ring in the lens barrel on the basis of a temperature detection signal of the sensor, and
wherein a temperature distribution in the circumferential direction of the light shielding ring is made to be uniform by rotating the light shielding ring.
2. The projector according to claim 1, wherein the rotation mechanism performs first rotation, which is for rotating at a first rotation speed, and second rotation which is for rotating at a second rotation speed lower than the first rotation speed after a certain period of time.

3. The projector according to claim 2,
wherein the rotation mechanism has a control section having the sensor, and
wherein the control section performs switching from the first rotation to the second rotation on the basis of change in temperature of the lens barrel.

4. The projector according to claim 1, wherein the rotation mechanism performs intermittent rotation to repeat rotation and stop, and performs first rotation, which is based on first intermittent rotation, and second rotation which is based on second intermittent rotation through which a period of time of the stop is longer than that of the first intermittent rotation after a certain period of time.

5. The projector according to claim 4,
wherein the rotation mechanism has a control section having the sensor, and
wherein the control section performs switching from the first rotation to the second rotation on the basis of change in temperature of the lens barrel.

6. The projector according to claim 1, wherein the rotation mechanism has a light shielding ring side gear which is formed circumferentially on an outer peripheral portion of the light shielding ring, a driving gear which engages with the light shielding ring side gear, and a motor which rotates the driving gear.

7. The projector according to claim 1, wherein the lens barrel is made of synthetic resin.

8. The projector according to claim 1, wherein the light shielding ring is made of metal.

9. The projector according to claim 1, wherein in a case where a distance from the optical axis of the projection lens to the center of the image forming panel is Y, a length of the image forming panel in a direction of shift is H, and an amount of shift of the image forming panel, which is obtained by dividing the distance Y by the length H, is set as $S=Y/H$, the amount of shift S is in a range of $0.4<S<0.7$.

10. A method of preventing image deterioration of the projector according to claim 1 in which a center of the image forming panel is shifted with respect to an optical axis of the projection lens and which projects an image of the image forming panel onto a projection surface through the projection lens by emitting light from a light source onto the image forming panel, the method of preventing image deterioration of the projector comprising:
mounting a light shielding ring that has an annular shape having an opening, through which the optical axis passes, on a lens barrel such that the light shielding ring is rotatable about the optical axis; and
rotating the light shielding ring.

11. The method of preventing image deterioration of the projector according to claim 10, wherein the light shielding ring is rotated through a first rotation, which is for rotating at a first rotation speed, and a second rotation which is for rotating at a second rotation speed lower than the first rotation speed after a certain period of time.

12. The method of preventing image deterioration of the projector according to claim 11, further comprising:
detecting a temperature of the lens barrel; and
switching from the first rotation to the second rotation on the basis of change in temperature of the lens barrel.

13. The method of preventing image deterioration of the projector according to claim 10, wherein the light shielding ring performs intermittent rotation to repeat rotation and stop, and is rotated through first rotation, which is based on first intermittent rotation, and second rotation which is based on second intermittent rotation through which a period of time of the stop is longer than that of the first intermittent rotation after a certain period of time.

14. The method of preventing image deterioration of the projector according to claim 13, further comprising:
detecting a temperature of the lens barrel; and
switching from the first rotation to the second rotation on the basis of change in temperature of the lens barrel.

15. The projector according to claim 1,
wherein the rotation mechanism has a control section having the sensor, and the control section rotates the light shielding ring while the light source being turned on.

* * * * *